United States Patent
Brocklesby et al.

(10) Patent No.: US 10,936,026 B2
(45) Date of Patent: *Mar. 2, 2021

(54) INFORMATION HANDLING SYSTEM HAVING A PRESSURE PLATE FOR A SOLID STATE BATTERY

(71) Applicant: DELL PRODUCTS, L.P., Round Rock, TX (US)

(72) Inventors: Brandon Joel Brocklesby, Pflugerville, TX (US); Richard C. Thompson, Cedar Park, TX (US); Deeder M. Aurongzeb, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/839,734

(22) Filed: Apr. 3, 2020

(65) Prior Publication Data
US 2020/0293097 A1    Sep. 17, 2020

Related U.S. Application Data

(63) Continuation of application No. 16/353,408, filed on Mar. 14, 2019, now Pat. No. 10,698,456.

(51) Int. Cl.
| | |
|---|---|
| *G06F 1/16* | (2006.01) |
| *G06F 1/18* | (2006.01) |
| *G06F 1/26* | (2006.01) |
| *H01M 2/10* | (2006.01) |

(52) U.S. Cl.
CPC .............. *G06F 1/188* (2013.01); *G06F 1/26* (2013.01); *H01M 2/1022* (2013.01); *H01M 2220/30* (2013.01)

(58) Field of Classification Search
CPC ........ G06F 1/1616; G06F 1/1635; G06F 1/188
USPC .............. 361/679.01, 679.02, 679.26, 679.27
See application file for complete search history.

(56) References Cited

U.S. PATENT DOCUMENTS

| | | | |
|---|---|---|---|
| 5,905,632 A | 5/1999 | Seto et al. | |
| 6,300,003 B1 | 10/2001 | Misra et al. | |
| 9,197,092 B2 | 11/2015 | Verdun et al. | |
| 10,128,533 B2* | 11/2018 | Yamamoto | H01M 10/0562 |
| 10,381,678 B2* | 8/2019 | Keates | H01M 10/0585 |
| 10,388,943 B2 | 8/2019 | Bonhomme et al. | |
| 10,535,870 B2 | 1/2020 | Honda et al. | |
| 10,698,456 B1* | 6/2020 | Brocklesby | G06F 1/188 |
| 2006/0185931 A1 | 8/2006 | Kawar | |
| 2013/0089769 A1 | 4/2013 | Proctor et al. | |
| 2014/0093760 A1 | 4/2014 | Hermann et al. | |
| 2014/0186685 A1 | 7/2014 | Kwon et al. | |
| 2014/0356671 A1 | 12/2014 | Dawley et al. | |
| 2015/0169002 A1 | 6/2015 | Kemppinen | |
| 2016/0248120 A1* | 8/2016 | Yamada | H01M 10/0562 |

(Continued)

*Primary Examiner* — Anthony Q Edwards
(74) *Attorney, Agent, or Firm* — Larson Newman, LLP

(57) ABSTRACT

An information handling system includes a solid state battery having a first major surface and a second major surface opposite the first major surface; a first pressure plate; a first elastomer layer between the first pressure plate and the first major surface of the solid state battery; a second pressure plate; and a second elastomer layer between the second pressure plate and the second major surface of the solid state battery, the first and second pressure plates configured to provide a compressive force to the solid state battery.

20 Claims, 7 Drawing Sheets

(56) References Cited

U.S. PATENT DOCUMENTS

2018/0212210 A1\* 7/2018 Suzuki ................. H01M 2/266
2018/0307290 A1 10/2018 Montero et al.

\* cited by examiner

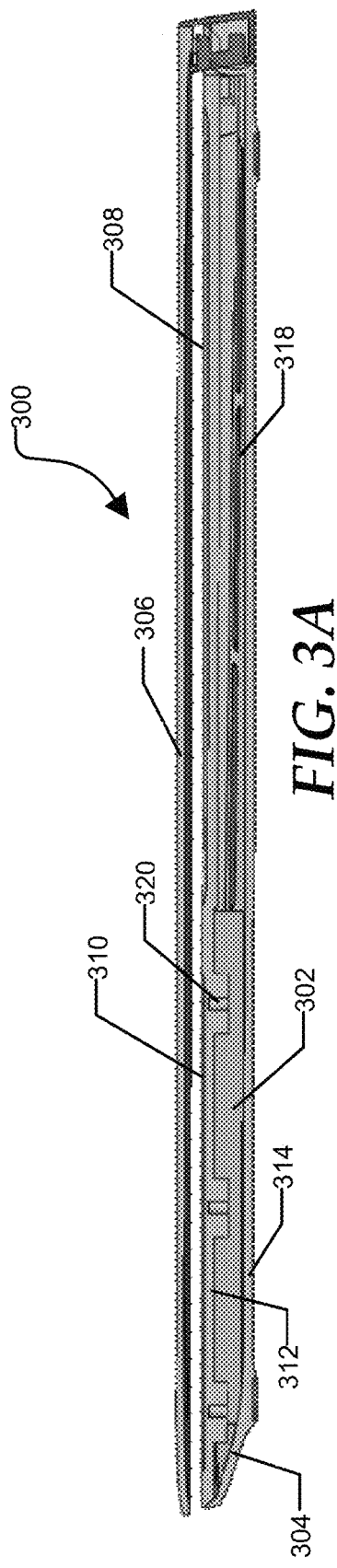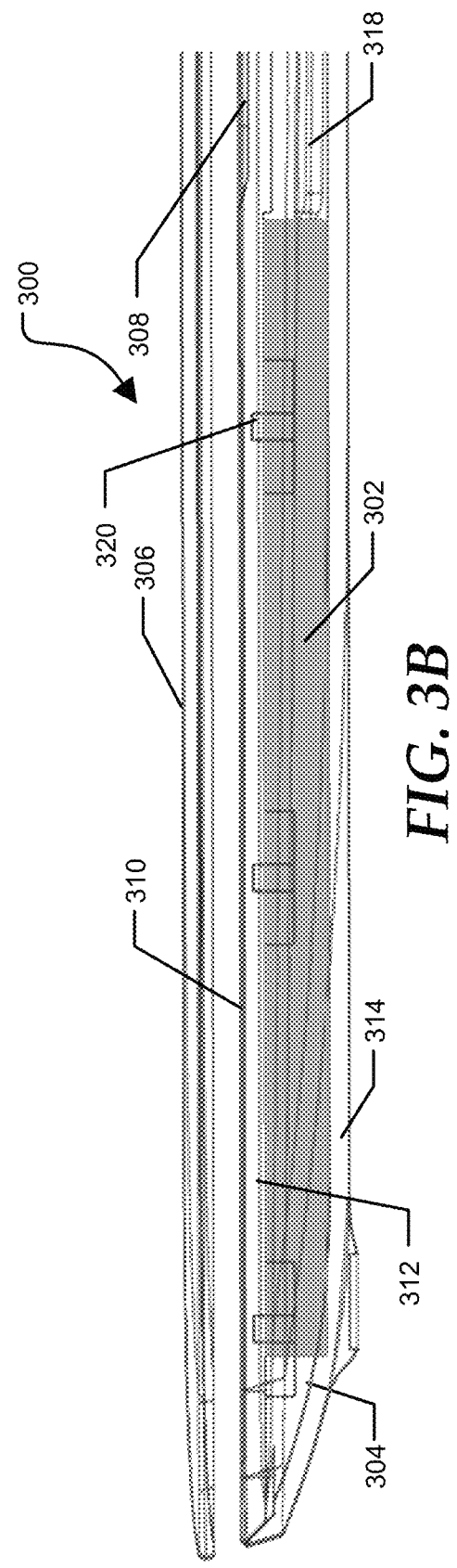
FIG. 3A
FIG. 3B

INFORMATION HANDLING SYSTEM HAVING A PRESSURE PLATE FOR A SOLID STATE BATTERY

CROSS-REFERENCE TO RELATED APPLICATION

This application is a continuation of U.S. patent application Ser. No. 16/353,408 entitled "Information Handling System Having a Pressure Plate for a Solid State Battery," filed on Mar. 14, 2019, the disclosure of which is hereby expressly incorporated by reference in its entirety.

FIELD OF THE DISCLOSURE

The present disclosure generally relates to information handling systems, and more particularly relates to an information handling system having a pressure plate for a solid state battery.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system can include a solid state battery having a first major surface and a second major surface opposite the first major surface; a first pressure plate; a first elastomer layer between the first pressure plate and the first major surface of the solid state battery; a second pressure plate; and a second elastomer layer between the second pressure plate and the second major surface of the solid state battery. The first and second pressure plates can be configured to provide a compressive force to the solid state battery.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 3A, 3B, and 4 are diagrams illustrating an exemplary information handling system using a solid state battery according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
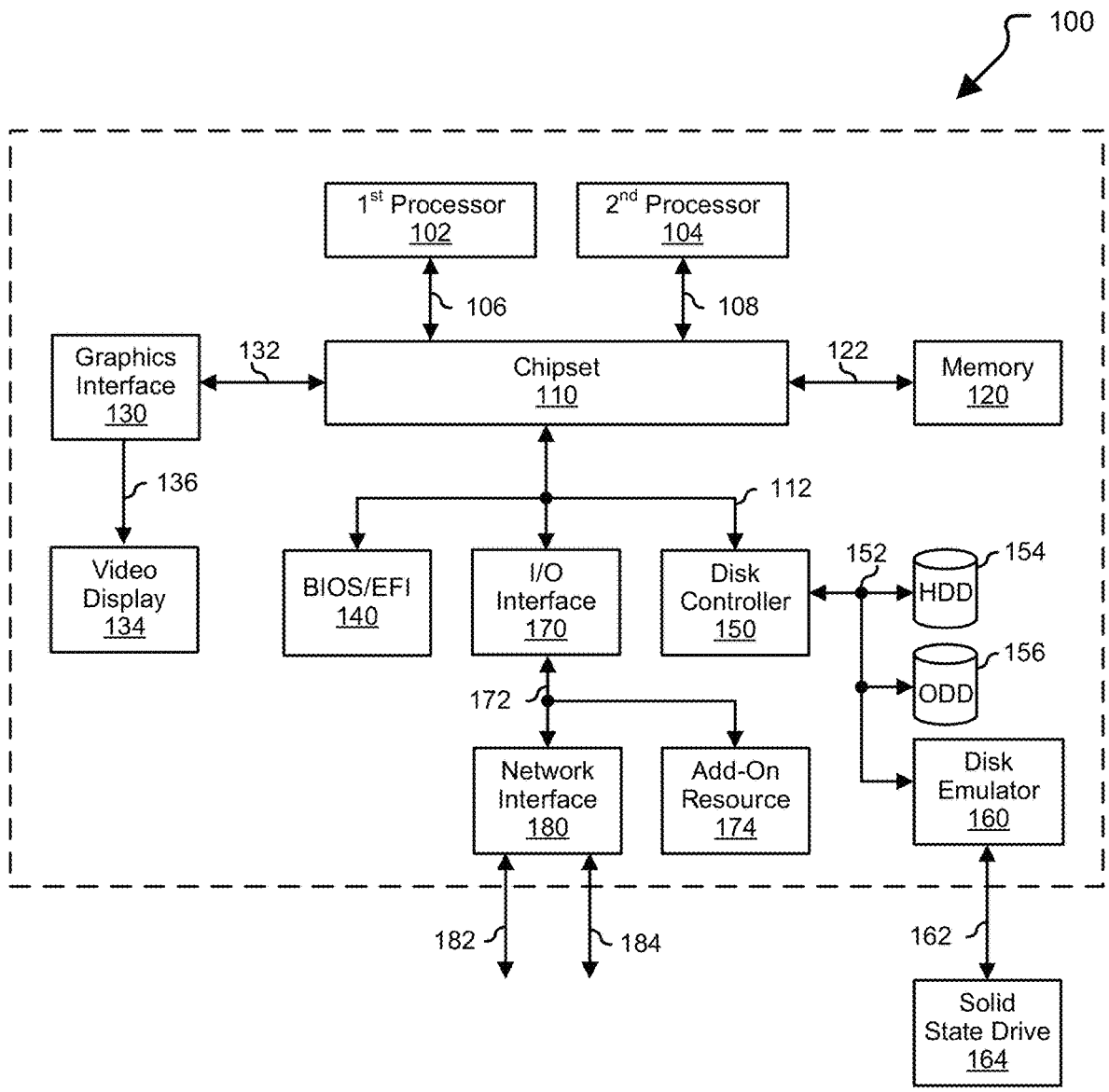
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2A:
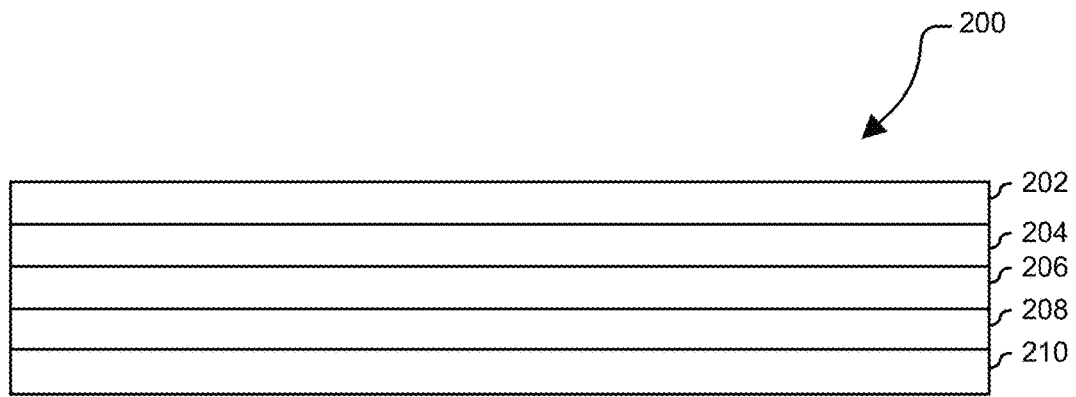
FIG. 2A is a schematic diagram illustrating an exemplary solid state battery according to an embodiment of the present disclosure.

Portable and mobile information handling systems, such as laptops, notebooks, tablets, and smart phones, rely on battery power when not connected to a power source. As users have adapted to the convenience of using information handling systems anywhere without worrying about being tethered to a power supply, they have sought devices with longer battery lives. Additionally, some users prefer thin and lightweight devices for mobile computing. FIG. 2A shows a solid state battery 200 that provides an increased energy density over liquid or polymer batteries often used in portable electronic devices. Where liquid or polymer batteries utilize a liquid or polymer electrolyte, solid state batteries utilize a solid electrolyte. In addition to higher energy densities, solid state batteries can have a higher temperature tolerance and recharge faster than liquid or polymer batteries.

Intercalation type batteries, such as Li-Ion batteries, rely on the movement of ions between a host anode material, such as graphite, and a host cathode material, such as a transition metal oxide. During charging or discharging, the ions leave one host material and migrate to the other host material. Since the host material remains at the anode or cathode, the structure of the anode and cathode remain substantially intact between charging cycles.

In contrast, a Li-Metal battery uses a lithium metal anode rather than a host material anode. The lithium metal is stripped from the lithium metal anode during discharge and lithium metal is plated on the lithium metal anode when charging. As there is no host material to maintain the structure of the anode when discharging, there can be a significant volumetric change in the anode between a charged state and a discharged state.

Figure 2B:
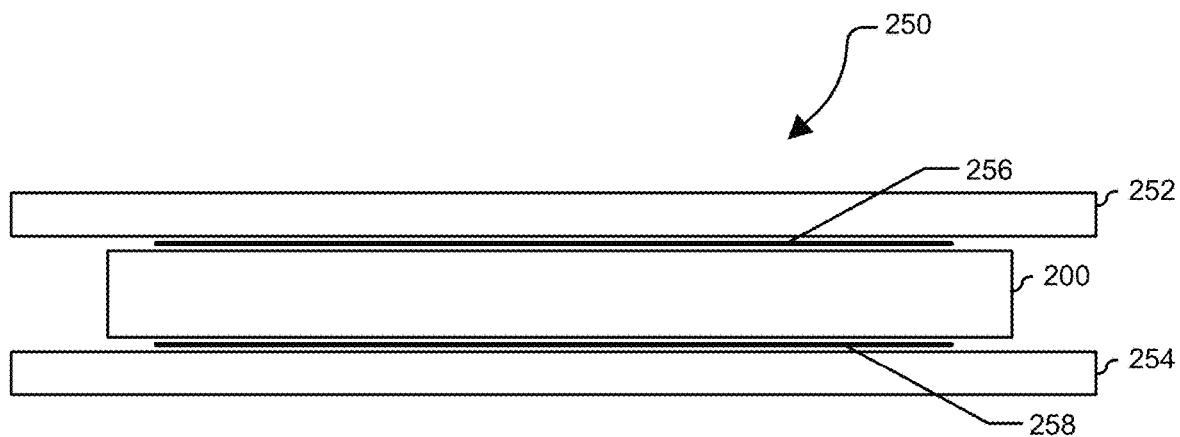
FIG. 2B is a schematic diagram illustrating an exemplary solid state battery pressure plate assembly according to an embodiment of the present disclosure.

The solid state battery 200 includes a cathode current collector 202, cathode 204, a solid electrolyte 206, an anode 208, and an anode current collector 210. When charging, ions, such as lithium ions, are transported from the cathode 204, across the solid electrolyte 206, to the anode 208. When used to power a device, the ions then travel from the anode, through the solid state electrolyte, to the cathode. In various embodiments, the solid state battery can be a Li-Metal battery where ions are stripped from the anode during discharge and plated on the anode during charging. Additionally, a good interface between the electrolyte and the anode can be critical for low boundary layer impedance. In order to maintain the interface while the volume of the Li-metal anode is changing due to the stripping/plating process, it can be desirable to keep the solid state battery under pressure. Additionally, the pressure has been shown to prevent the formation of dendrite structures during the plating process. FIG. 2B shows a solid state battery pressure plate assembly 250 in which solid state battery 200 is sandwiched between pressure plates 252 and 254. Elastomer layers 256 and 258 are between the pressure plates 252 and 254 and the solid state battery. Applying pressure to the solid state battery 200 can limit formation of dendrites during charge cycles. In various embodiments the pressure plates 252 and 254 can be configured to provide between about 140 kPa and about 1400 kPa of compressive force to the solid state battery, even between about 275 kPa and about 700 kPa of compressive force.

In order to apply an even pressure across the face of the solid state battery, the pressure plate can have a high stiffness, such as being formed of a material with a Young's Modulus of at least about 40 GPa. Additionally, because overall weight can be a consideration in the design of portable and mobile devices, the pressure plate can be formed of a material with a specific stiffness of at least about $20 \text{ m}^3/\text{s}^2$. Suitable materials can include metals such as steel, aluminum, magnesium and the like, and reinforced plastics such as carbon epoxy, and S-glass epoxy.

In various embodiments, the elastomer layers 256 and 258 can aid in providing an even pressure across the face of the solid state battery 200. Additionally, in some embodiments, the elastomer can provide an electrically insulating barrier between the solid state battery 200 and the pressure plates 252 and 254. To aid in heat management of the battery, the elastomer can also be thermally conductive.

Figure 4:
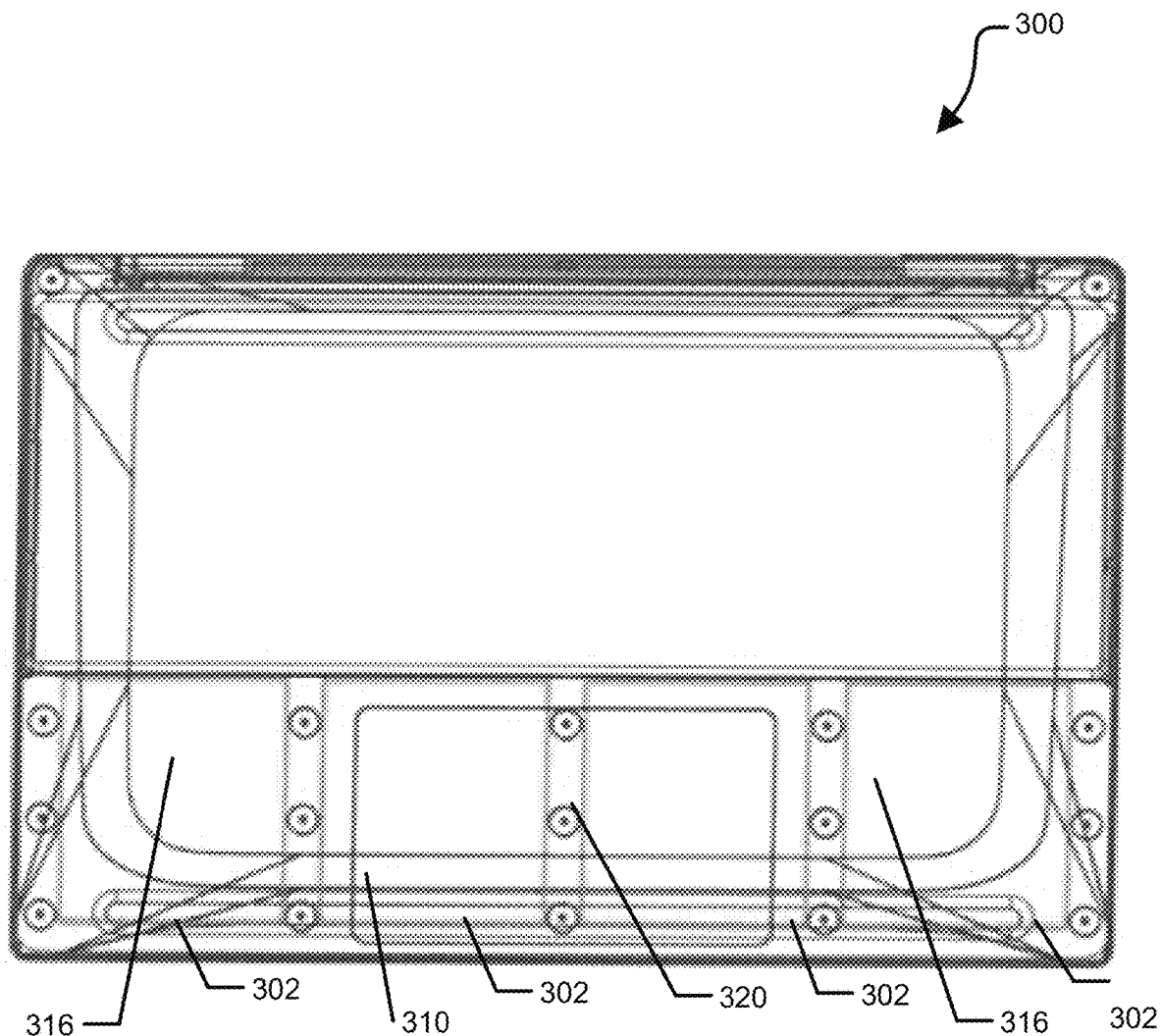

FIGS. 3A and 3B show a side view and FIG. 4 shows a top view of information handling system 300 incorporating solid state batteries 302. The information handling system 300 can include a bottom case portion 304 and a display portion 306. The bottom case portion can include a keyboard 308, a touch sensitive input device 310, an upper support structure 312 and a lower support structure 314. Additionally, palm rest areas 316 can be positioned adjacent to the touch sensitive input device 310. In various embodiments, the solid state batteries 302 can be positioned in the area of the touch sensitive input device 310 and the palm rest areas 316, leaving the area under the keyboard 308 available for internal electronic components 318. In various embodiments, upper support structure 312 and lower support structure 314 can serve as the pressure plates, applying pressure to the solid state battery. Numerous screws or other fastening devices 320 may be positioned adjacent to the solid state battery to ensure appropriate pressure is applied.

Figure 5:
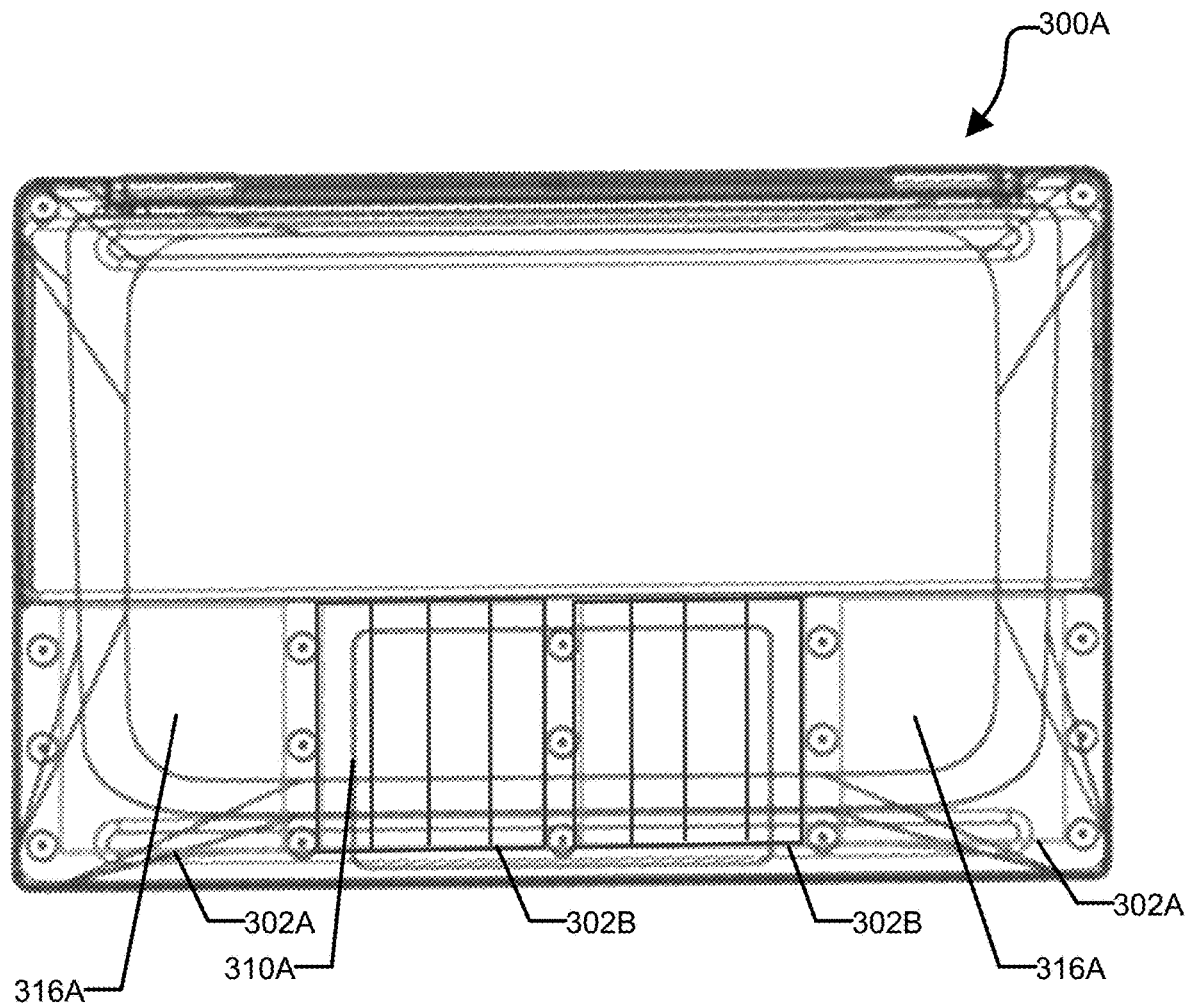
FIG. 5 is a diagram illustrating an exemplary information handling system using a combination of solid state batteries and liquid or polymer batteries.

FIG. 5 shows a top view of an alternate embodiment of information handling system 300A. Depending on the thickness and type of touch sensitive input device, it can be difficult to maintain the required stack pressure under the touch sensitive input device 310A. As an alternative, information handing system 300A can incorporating a hybrid battery system with solid state plating/stripping type batteries 302A and under the palm rest 316A and a intercalation type battery 302B that does not require a pressure plate or stack pressure to operate under touch sensitive input device 310A. In various embodiments, intercalation type battery 302B can have a liquid or polymer electrolyte. In other embodiments, intercalation type battery 302B can utilize a solid state electrolyte with an anode host material that maintains the anode structure even after when discharged.

Figure 6A:
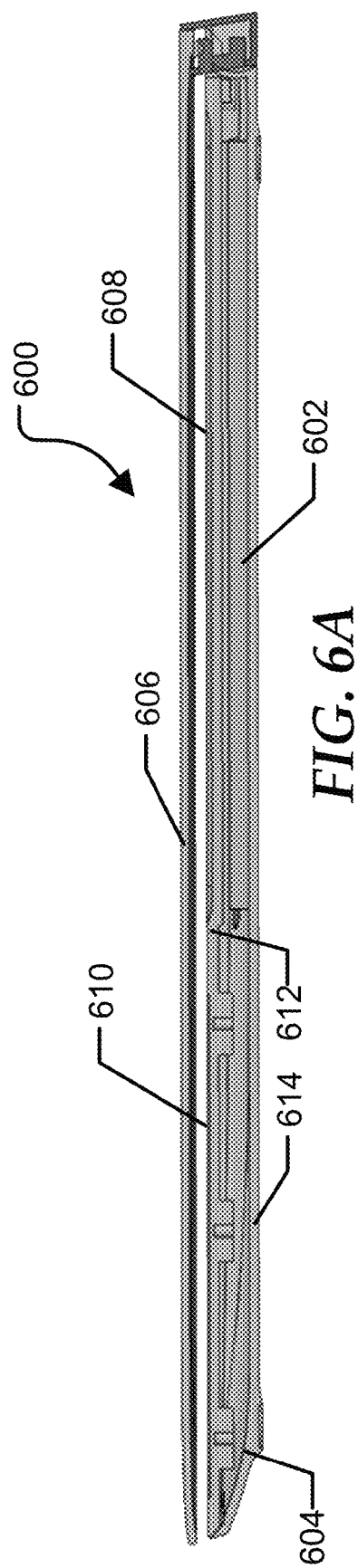
FIGS. 6A, 6B, and 7 are diagrams illustrating another exemplary information handling system using a solid state battery according to an embodiment of the present disclosure.
Figure 6B:
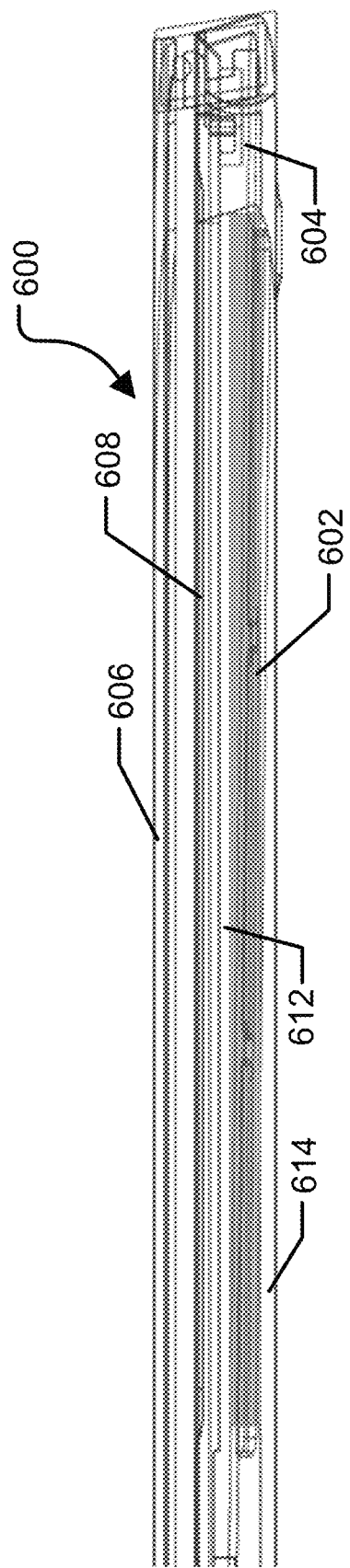
Figure 7:
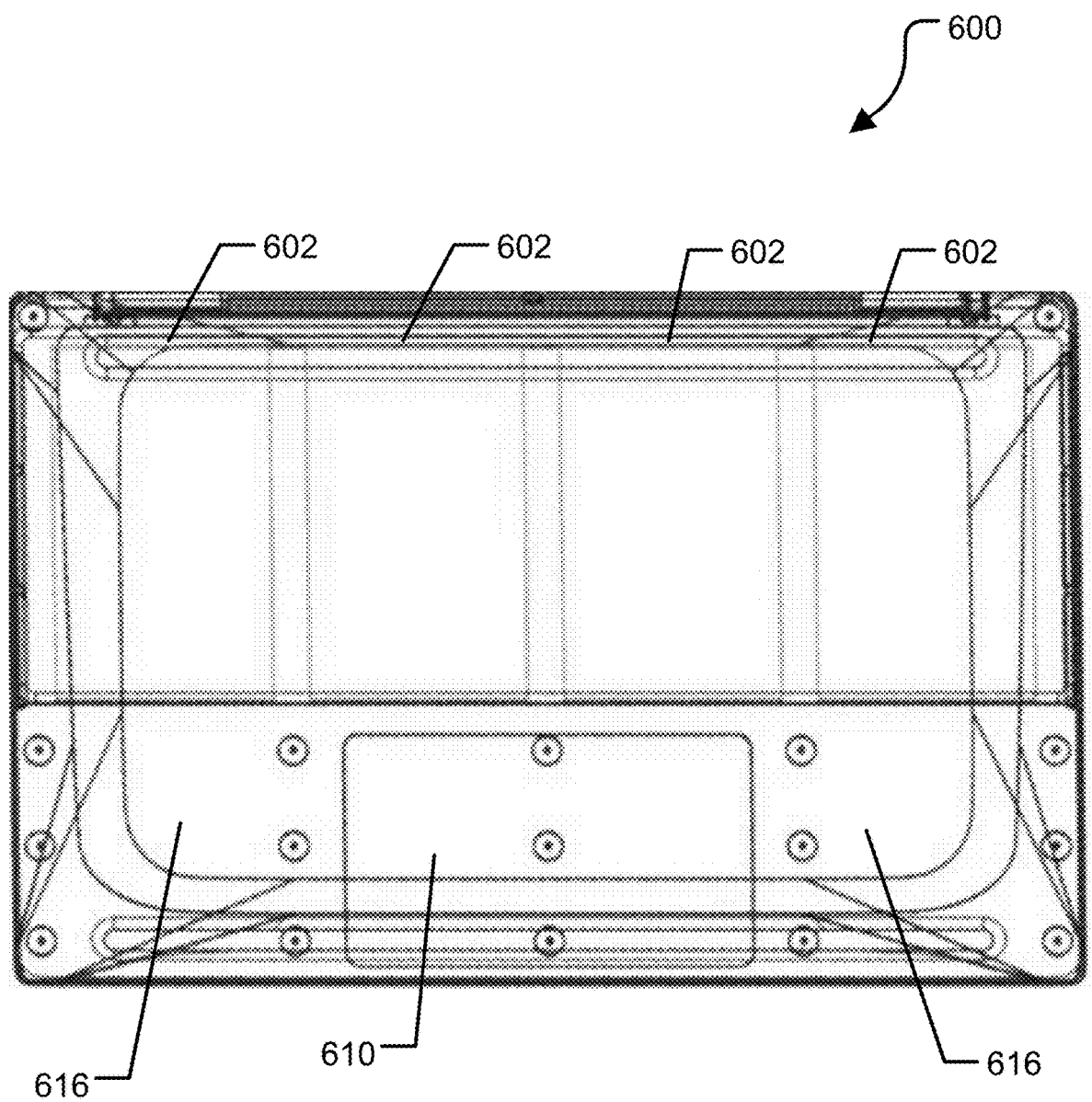

FIGS. 6A and 6B show a side view and FIG. 7 shows a top view of information handling system 600 incorporating solid state batteries 602. The information handling system 600 can include a bottom case portion 604 and a display portion 606. The bottom case portion can include a keyboard 608, a touch sensitive input device 610, an upper support structure 612 and a lower support structure 614. Additionally, palm rest areas 616 can be positioned adjacent to the touch sensitive input device 610. In various embodiments, the solid state batteries 602 can be positioned under the keyboard 608, leaving the area of the touch sensitive input device 610 and the palm rest areas 616 available for internal electronic components (not shown). In various embodiments, upper support structure 612 and lower support structure 614 can serve as the pressure plates, applying pressure to the solid state battery.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   at least one solid state battery having a first major surface and a second major surface opposite the first major surface;
   a first pressure plate;
   a first elastomer layer between the first pressure plate and the first major surface of the solid state battery;
   a second pressure plate; and
   a second elastomer layer between the second pressure plate and the second major surface of the solid state battery,
   the first and second pressure plates each having a Young's Modulus of at least about 40 GPa.

2. The information handling system of claim 1, wherein the compressive force is not greater than about 1400 kPa.

3. The information handling system of claim 1, wherein the compressive force is between about 275 kPa and about 700 kPa.

4. The information handling system of claim 1, wherein the information handling system further includes an external case and the first pressure plate is incorporated into a portion of the external case.

5. The information handling system of claim 1, wherein the information handling system further includes a palm rest area and the second internal plate provides structural support for the palm rest area.

6. The information handling system of claim 1, wherein the information handling system further includes at least one liquid battery or at least one polymer battery.

7. The information handling system of claim 1, wherein the information handling system further includes a keyboard and the second internal plate provides structural support for the keyboard.

8. The information handling system of claim 1, wherein the first and second pressure plates each have a specific stiffness of at least about 20 m$^2$/s$^2$.

9. An information handling system, comprising:
at least one solid state battery having a first major surface and a second major surface opposite the first major surface;
a first pressure plate;
a first elastomer layer between the first pressure plate and the first major surface of the solid state battery;
a second pressure plate; and
a second elastomer layer between the second pressure plate and the second major surface of the solid state battery.

10. The information handling system of claim 9, wherein the information handling system further includes an external case and the first pressure plate is incorporated into a portion of the external case.

11. The information handling system of claim 9, wherein the information handling system further includes a palm rest area and the second internal plate provides structural support for the palm rest area.

12. The information handling system of claim 9, wherein the information handling system further includes at least one liquid battery or at least one polymer battery.

13. The information handling system of claim 9, wherein the information handling system further includes a keyboard and the second internal plate provides structural support for the keyboard.

14. An information handling system, comprising:
a first battery component including:
at least one solid state battery having a first major surface and a second major surface opposite the first major surface;
a first pressure plate;
a first elastomer layer between the first pressure plate and the first major surface of the solid state battery;
a second pressure plate; and
a second elastomer layer between the second pressure plate and the second major surface of the solid state battery; and
a second battery component including an intercalation type battery.

15. The information handling system of claim 14, wherein the compressive force is between about d140 kPa and about 1400 kPa.

16. The information handling system of claim 14, wherein the compressive force is between about 275 kPa and about 700 kPa.

17. The information handling system of claim 14, wherein the information handling system further includes an external case and the first pressure plate is incorporated into a portion of the external case.

18. The information handling system of claim 14, wherein the information handling system further includes a palm rest area and the second internal plate provides structural support for the palm rest area.

19. The information handling system of claim 14, wherein the intercalation type battery includes at least one liquid battery or at least one polymer battery.

20. The information handling system of claim 14, wherein the information handling system further includes a keyboard and the second internal plate provides structural support for the keyboard.

* * * * *